US010475585B2

(12) United States Patent
Sato et al.

(10) Patent No.: US 10,475,585 B2
(45) Date of Patent: Nov. 12, 2019

(54) FILM CAPACITOR

(71) Applicant: Panasonic Intellectual Property Management Co., Ltd., Osaka (JP)

(72) Inventors: Shinya Sato, Toyama (JP); Hidekazu Matsuoka, Kyoto (JP); Toshihisa Miura, Toyama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 219 days.

(21) Appl. No.: 15/327,644

(22) PCT Filed: Aug. 19, 2015

(86) PCT No.: PCT/JP2015/004121
§ 371 (c)(1),
(2) Date: Jan. 19, 2017

(87) PCT Pub. No.: WO2016/027462
PCT Pub. Date: Feb. 25, 2016

(65) Prior Publication Data
US 2017/0207027 A1 Jul. 20, 2017

(30) Foreign Application Priority Data
Aug. 21, 2014 (JP) ................... 2014-168149

(51) Int. Cl.
*H01G 4/33* (2006.01)
*H01G 4/005* (2006.01)
(Continued)

(52) U.S. Cl.
CPC ............. *H01G 4/33* (2013.01); *H01G 2/04* (2013.01); *H01G 4/005* (2013.01); *H01G 4/18* (2013.01);
(Continued)

(58) Field of Classification Search
CPC ........... H01G 4/33; H01G 4/005; H01G 4/002
(Continued)

(56) References Cited

U.S. PATENT DOCUMENTS

| 2011/0248719 A1* | 10/2011 | Aoki | H01M 10/482 324/426 |
| 2014/0116751 A1* | 5/2014 | Hatori | H02M 7/003 174/129 B |
| 2014/0153189 A1* | 6/2014 | Okamura | H05K 1/0213 361/688 |

FOREIGN PATENT DOCUMENTS

| JP | 56-078334 U | 6/1981 |
| JP | 58-081924 U | 6/1983 |

(Continued)

OTHER PUBLICATIONS

International Search Report of PCT application No. PCT/JP2015/004121 dated Nov. 2, 2015.

*Primary Examiner* — Michael P McFadden
(74) *Attorney, Agent, or Firm* — McDermott Will & Emery LLP

(57) ABSTRACT

A film capacitor includes: a capacitor element in which a metallikon electrode is formed at an end; a bus bar connected to the metallikon electrode; and a holding member having a slit into which the bus bar is inserted, the slit being formed with protrusions. The bus bar inserted into the slit is press-contacted with the protrusions, and as a result, the bus bar is held by the holding member. With this configuration, relative mounting accuracy (positioning accuracy) of positive and negative electrode bus bars is improved, and further, the bus bars can be easily connected to the capacitor elements.

18 Claims, 11 Drawing Sheets

(51) Int. Cl.
  *H01G 4/002* (2006.01)
  *H01G 2/04* (2006.01)
  *H01G 4/18* (2006.01)
  *H01G 4/228* (2006.01)

(52) U.S. Cl.
  CPC ............ *H01G 4/228* (2013.01); *H01G 4/002* (2013.01); *Y02T 10/7022* (2013.01)

(58) Field of Classification Search
  USPC ........................................................ 361/303
  See application file for complete search history.

(56) References Cited

FOREIGN PATENT DOCUMENTS

| | | |
|---|---|---|
| JP | 1-121901 U | 8/1989 |
| JP | 2010-251400 | 11/2010 |

\* cited by examiner

FILM CAPACITOR

CROSS-REFERENCE TO RELATED APPLICATIONS

This application is a U.S. national stage application of the PCT International Application No. PCT/JP2015/004121 filed on Aug. 19, 2015, which claims the benefit of foreign priority of Japanese patent application No. 2014-168149 filed on Aug. 21, 2014, the contents all of which are incorporated herein by reference.

TECHNICAL FIELD

The present invention relates to a film capacitor used for various kinds of electronic equipment, electric equipment, industrial equipment, automobiles or the like (hereinafter referred to as "external equipment"), and particular to a film capacitor which is most appropriate for smoothing, for a filter, for a snubber, or the like of a motor driving inverter circuit of a hybrid vehicle or the like.

BACKGROUND ART

A film capacitor incorporated in external equipment is mechanically and electrically connected with the external equipment via an external connection terminal of the film capacitor.

FIG. 14 is an exploded perspective view showing a configuration of a conventional film capacitor before resin molding, and FIG. 15 is an enlarged perspective view of a main part in FIG. 14.

As shown in FIG. 14, the film capacitor includes capacitor element 91, a pair of bus bars 92 formed of a copper plate or the like, holding member 93 having insulation, and resin case 99.

At one end of bus bar 92, element connection part 928 is connected to metallikon electrode 911 of capacitor element 91 by soldering, resistance welding, or the like. Further, bus bar 92 is bent into an L-shape so as to be directed to an upper side (an opening) of case 99, and another end of bus bar 92 is provided with external connection terminal 929 partially protruding from case 99. This external connection terminal 929 is mechanically and electrically connected to external equipment (not shown). In order to facilitate this connection work, relative positions of respective external connection terminals 929, 929 provided at the pair of bus bars 92, 92 are extremely important.

Accordingly, the conventional film capacitor shown in FIG. 14 has the following configuration.

The pair of bus bars 92, 92 facing each other has overlapping parts 927 which overlap in a facing direction (a Y direction). Resin holding member 93 is provided with protrusion 93F on a surface of holding member 93, and overlapping part 927 of bus bar 92 is formed with hole 92F at a position corresponding to protrusion 93F. Also, by fitting protrusion 93F of this holding member 93 and hole 92F provided at overlapping part 927, the relative positions of external connection terminals 929 of the pair of bus bars 92 are temporarily fixed, and the positions of the pair of bus bars 92 and the holding member 93 are temporarily fixed.

Such film capacitor having protrusion 93F and hole 92F is, for example, disclosed in PTL 1.

According to a technique disclosed in PTL 1, bus bar 92 can be certainly positioned relative to holding member 93 in an X direction and a Z direction by fitting protrusion 93F into hole 92F. However, bus bar 92 cannot be positioned relative to holding member 93 in the Y direction (an insertion direction of protrusion 93F into hole 92F).

Accordingly, when bus bar 92 is connected to metallikon electrode 911 of capacitor element 91 by soldering, resistance welding, or the like, it is necessary to use a positioning jig which regulates a positional shift in the Y direction. Also, when a positive electrode bus bar is connected to a positive metallikon electrode, it is necessary to use a positive electrode positioning jig which regulates a positional shift in a plus Y direction. Moreover, when a negative electrode bus bar is connected to a negative metallikon electrode, it is necessary to use a negative electrode positioning jig which regulates a positional shift in a minus Y direction. In bus bar mounting/connecting processes, steps of positioning (a positive electrode), connecting (the positive electrode), positioning (a negative electrode), and connecting (the negative electrode) must be sequentially performed, and the connecting process becomes complex/complicated.

Further, even when bus bar 92 is temporarily fixed by using the positioning jig, a relative position in the Y direction of bus bar 92 with respect to holding member 93 may be shifted by completion of the connection. This is because holding member 93 and bus bar 92 are not unmovably fixed to each other, and holding member 93 and bus bar 92 are only indirectly and temporarily fixed via the positioning jig.

In other words, a film capacitor capable of improving relative mounting accuracy (positioning accuracy) of positive and negative electrode bus bars and capable of easily connecting the bus bars to a capacitor element is required.

CITATION LIST

Patent Literature

PTL 1: Unexamined Japanese Patent Publication No. 2010-251400

SUMMARY OF THE INVENTION

A first invention of the present application is a film capacitor including: a capacitor element in which a metallikon electrode is formed at an end; a bus bar connected to the metallikon electrode; and a holding member having a slit into which the bus bar is inserted, the slit being formed with protrusions. The bus bar inserted into the slit is press-contacted with the protrusions, and as a result, the bus bar is held by the holding member.

According to the first invention of the present application, relative mounting accuracy (positioning accuracy) of a positive electrode bus bar and the holding member can be improved, and further, relative mounting accuracy (positioning accuracy) of a negative electrode bus bar and the holding member can be also improved. As a result, relative mounting accuracy (positioning accuracy) of the positive electrode bas bar and the negative electrode bus bar can be improved. Further, a film capacitor capable of easily connecting the bus bars to the capacitor elements can be provided.

A second invention of the present application is a film capacitor including: a capacitor element in which a metallikon electrode is formed at an end; a bus bar connected to the metallikon electrode and having a locked part; and a holding member having a slit into which the bus bar is inserted, an abutting part, and a locking protrusion. When an extending direction of the slit is a first direction, a direction vertical to the first direction and parallel to a principal surface of the holding member is a second direction, and a direction vertical to the first direction and the second direction, respectively, is a third direction, the bus bar is sandwiched between the slits in the second direction and is sandwiched between the slits in the third direction, and the bus bar is abutted by the abutting part from one side in the first direction and is locked by the locking protrusion from another side in the first direction.

According to the second invention of the present application, relative mounting accuracy (positioning accuracy) of a positive electrode bus bar and the holding member can be improved, and further, relative mounting accuracy (positioning accuracy) of a negative electrode bus bar and the holding member can be also improved. As a result, relative mounting accuracy (positioning accuracy) of the positive electrode bas bar and the negative electrode bus bar can be improved. Further, a film capacitor capable of easily connecting the bus bars to the capacitor elements can be provided.

DESCRIPTION OF EMBODIMENTS

Hereinafter, a configuration of a film capacitor and a method for manufacturing the film capacitor in exemplary embodiments of the present invention are described with reference to the drawings.

First Exemplary Embodiment

Figure 1:
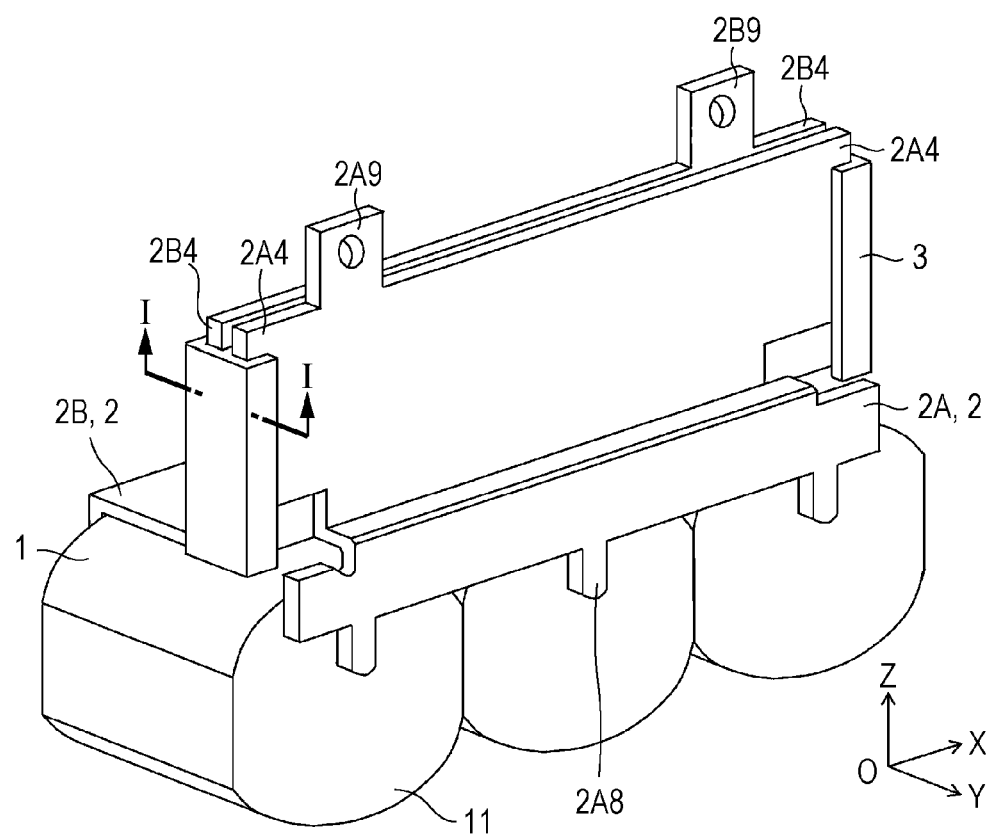
FIG. 1 is a perspective view of a main part of a film capacitor in a first exemplary embodiment of the present invention.
Figure 2:
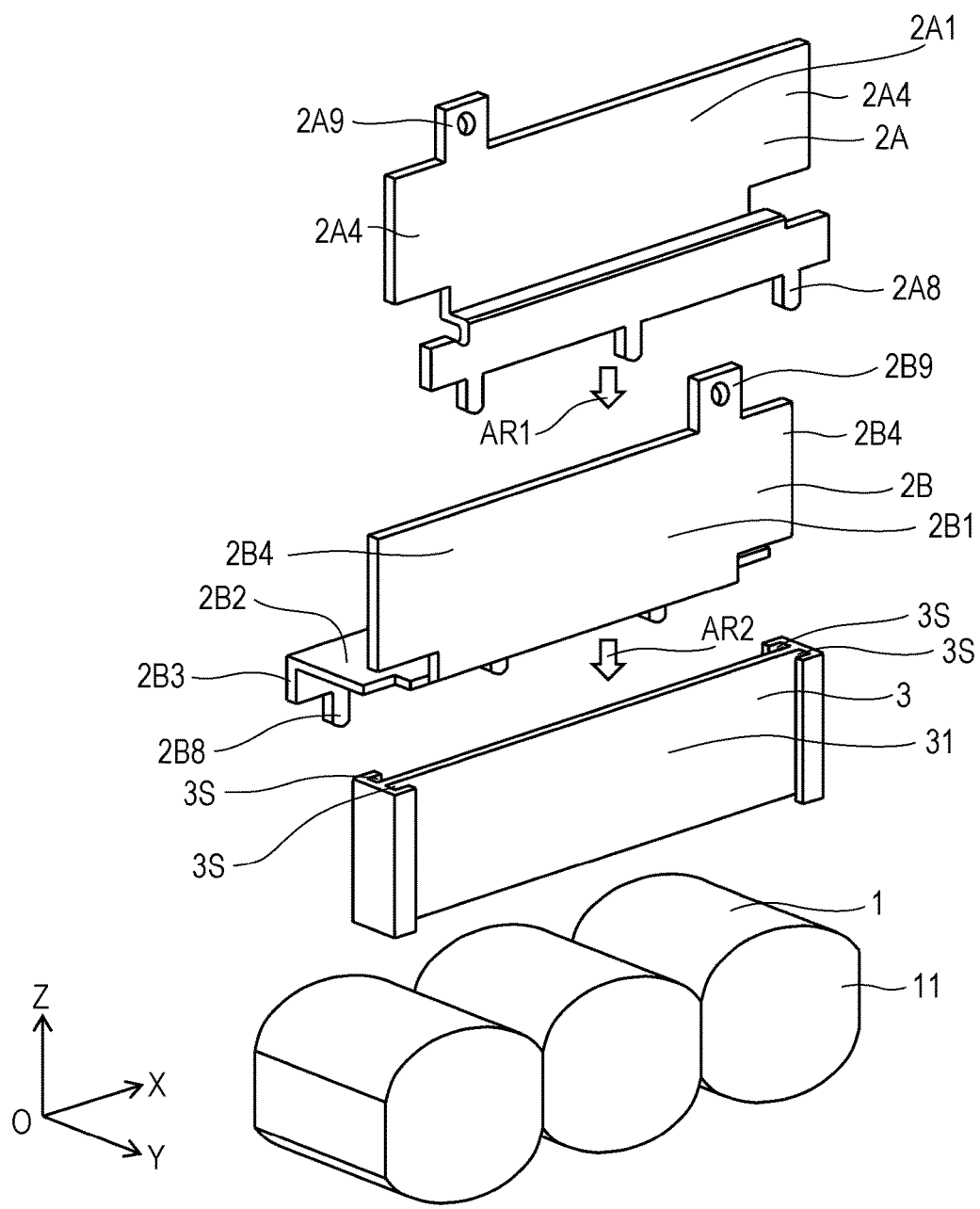
FIG. 2 is an exploded perspective view of the main part of the film capacitor in the first exemplary embodiment of the present invention.

FIG. 1 is a perspective view of a main part (capacitor elements/a holding member mounted with bus bars) of a film capacitor excluding a case and a sealing resin layer according to a first exemplary embodiment. FIG. 2 is an exploded perspective view of the main part of the film capacitor.

As shown in FIG. 1, the film capacitor in the first exemplary embodiment includes three capacitor elements 1.

A configuration of capacitor element 1 is described below. Capacitor element 1 has two end surfaces and a side surface connecting these two end surfaces. Capacitor element 1 is formed in a flat shape (a shape having two flat surfaces and two curved surfaces), as viewed from the end surface. Further, capacitor element 1 includes a pair of metallized films. The metallized film is a film in which a vapor-deposited metal layer (a vapor-deposited electrode) is formed by vapor-depositing aluminum on at least one surface of surfaces of a dielectric film formed of polypropylene (hereinafter referred to as "PP") or the like. Then, this pair of metallized films is overlapped and wound around, thereby forming a winding body. Further, metallikon electrode 11 formed of zinc is formed on both end surfaces of this winding body. The vapor-deposited metal layer having a positive electrode is connected with the metallikon electrode having a positive electrode, and the vapor-deposited metal layer having a negative electrode is connected with the metallikon electrode having a negative electrode.

Figure 6:
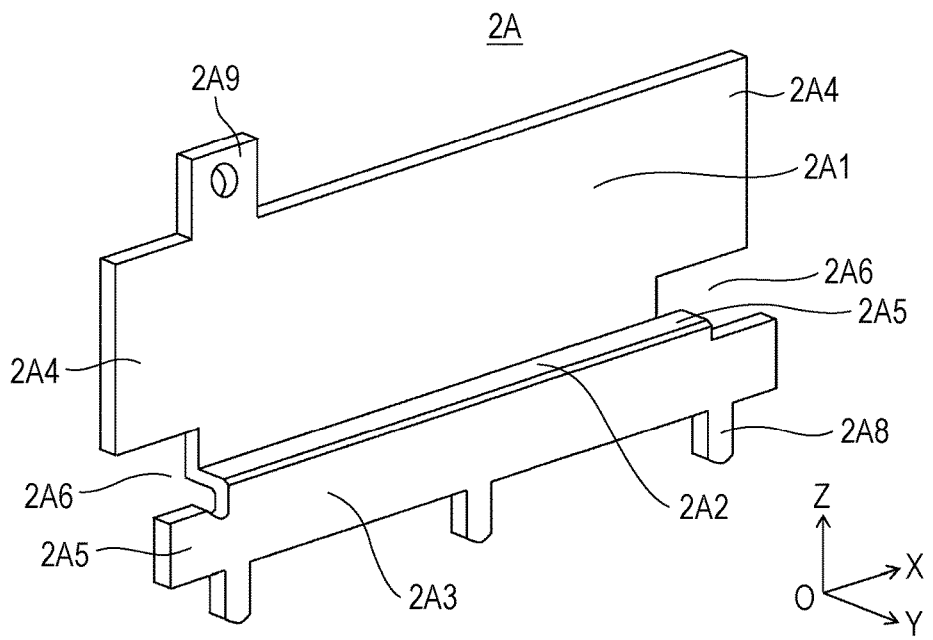
FIG. 6 is a perspective view of a positive electrode bus bar of the film capacitor in the first and second exemplary embodiments of the present invention.

As shown in FIGS. 1 and 2, metal bus bar 2 formed of, for example, copper is configured with positive electrode bus bar 2A and negative electrode bus bar 2B. FIG. 6 is a perspective view of positive electrode bus bar 2A used in the first exemplary embodiment and the second exemplary embodiment, which will be described below. As shown in FIG. 6, positive electrode bus bar 2A is configured by integrally connecting first portion 2A1, second portion 2A2, and third portion 2A3. Second portion 2A2 is a portion bent by 90 degrees relative to first portion 2A1, and third portion 2A3 is a portion bent by 90 degrees relative to second portion 2A2. It should be noted that positive electrode bus bar 2A is one example of a first bus bar and that negative electrode bus bar 2B is one example of a second bus bar.

First portion 2A1 has a substantially rectangular shape, and includes external connection terminal 2A9 on one end side in a longitudinal direction (an end side in a minus X direction). External connection terminal 2A9 protrudes from a sealing resin layer (not shown) in a state in which capacitor elements 1 are sealed by a case (not shown) and the sealing resin layer, and is mechanically and electrically connected to external equipment (not shown). Third portion 2A3 is provided with three element connection parts 2A8, each of which is connected to metallikon electrode 11 by soldering, resistance welding, or the like.

As shown in FIG. 2, negative electrode bus bar 2B also includes first portion 2B1, second portion 2B2, and third portion 2B3 as with positive electrode bus bar 2A. Second portion 2B2 is a portion bent by 90 degrees relative to first portion 2B1, and third portion 2B3 is a portion bent by 90 degrees relative to second portion 2B2.

First portion 2B1 has a substantially rectangular shape, and includes external connection terminal 2B9 on another end side in the longitudinal direction (an end side in a plus X direction). External connection terminal 2B9 protrudes from the sealing resin layer (not shown) in a state in which capacitor elements 1 are sealed by the case (not shown) and the sealing resin layer, and is mechanically and electrically connected to the external equipment (not shown). Third portion 2B3 is provided with three element connection parts 2B8, each of which is connected to metallikon electrode 11 by soldering, resistance welding, or the like. Further, a length in a Y direction of second portion 2B2 of negative electrode bus bar 2B is larger than a length in the Y direction of second portion 2A2 of positive electrode bus bar 2A.

Both a principal surface of positive electrode bus bar 2A and a principal surface of negative electrode bus bar 2B face flat plate 31 of holding member 3, which will be described below.

Holding member 3 is formed of an insulating resin, and has substantially rectangular flat plate 31 as shown in FIG. 2. Slit 3S for fixing positive electrode bus bar 2A is provided at each end in the longitudinal direction (the X direction) of a first principal surface (a plus Y direction side) of flat plate 31. Slit 3S for fixing negative electrode bus bar 2B is provided at each end in the longitudinal direction (the X direction) of a second principal surface (a minus Y direction side) on a side opposite to the first principal surface.

Figure 3:
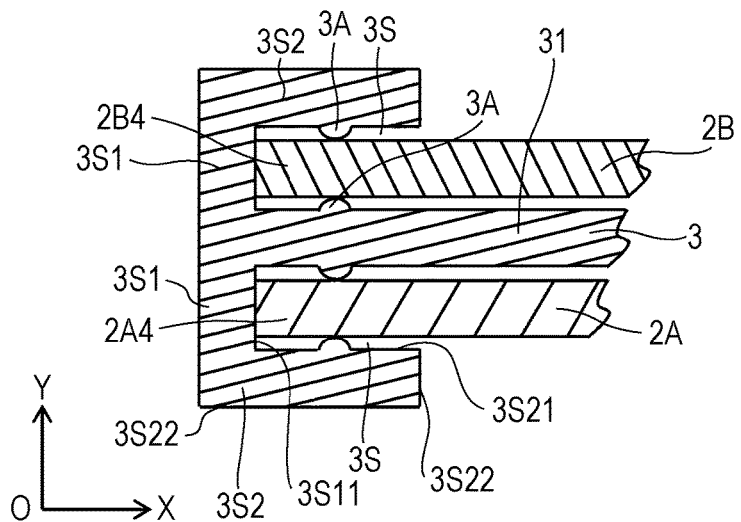
FIG. 3 is a partial sectional view of a vicinity of a slit part of the film capacitor in the first exemplary embodiment of the present invention.

FIG. 3 is a partial sectional view taken along a cutting line I-I in FIG. 1. Vertical wall 3S1 and parallel wall 3S2 are sequentially connected to respective ends on the first principal surface side and the second principal surface side of flat plate 31, and a space surrounded by a surface of flat plate 31, inner surface 3S11 of vertical wall 3S1, and inner surface 3S21 of parallel wall 3S2 configures slit 3S. Further, protrusion 3A linearly extending along an extending direction (a Z direction) of the slit is formed on the surface of flat plate 31 and inner surface 3S21 of parallel wall 3S2, which face slit 3S, respectively. It should be noted that slit 3S formed at a plus X side end of holding member 3 also has the same configuration as the configuration in FIG. 3.

A position in the X direction of positive electrode bus bar 2A inserted into slit 3S is regulated by one or both of inner surface 3S 11 of vertical wall 3S1 of slit 3S on a minus X side and inner surface 3S11 of vertical wall 3S1 of slit 3S on the plus X side. The same applies to a position in the X direction of negative electrode bus bar 2B inserted into slit 3S.

End 2A4 of positive electrode bus bar 2A inserted into slit 3S is press-contacted with protrusions 3A in the minus Y direction and in the plus Y direction, thereby regulating a position in the Y direction of positive electrode bus bar 2A. The same applies to a position in the Y direction of negative electrode bus bar 2B inserted into slit 3S.

Also, protrusions 3A press-contact positive electrode bus bar 2A and negative electrode bus bar 2B, thereby fixing relative positions of positive electrode bus bar 2A, negative electrode bus bar 2B, and holding member 3 in the three directions of X, Y, Z.

Further, in the present exemplary embodiment, on each of the first principal surface side and the second principal surface side of flat plate 31 of holding member 3, two slits 3S in total are respectively provided at both ends in an arrangement direction (i.e., the X direction) of the capacitor elements. Accordingly, press-contacting force (an added value) between ends 2A4, 2B4 of bus bars 2A, 2B and protrusions 3A of slits 3S becomes large, positive electrode bus bar 2A, negative electrode bus bar 2B, and holding member 3 can be more reliably fixed to each other, and relative mounting accuracy of these three members can be improved.

Further, first portion 2A1 of positive electrode bus bar 2A and first portion 2B1 of negative electrode bus bar 2B face via holding member 3, and positive electrode bus bar 2A and negative electrode bus bar 2B have overlapping parts which overlap each other in a facing direction (the Y direction). Since directions of currents which respectively flow in first portion 2A1 of positive electrode bus bar 2A and first portion 2B1 of negative electrode bus bar 2B are reversed, mutual inductance can be lowered. In other words, the holding member has the first principal surface and the second principal surface on the side opposite to the first principal surface, and the positive electrode bus bar is held on the first principal surface and the negative electrode bus bar is held on the second principal surface. Accordingly, the mutual inductance can be lowered.

(Manufacturing Method)

A method for manufacturing the film capacitor of the present exemplary embodiment is described below.

(Capacitor Element Forming Process)

Capacitor element 1 is manufactured in a capacitor element forming process. First, aluminum is vapor-deposited on one surface of the dielectric film formed of PP, thereby forming the metallized film formed with the vapor-deposited metal layer (the vapor-deposited electrode). It should be noted that aluminum is used as the vapor-deposited metal in the present exemplary embodiment. However, zinc, magnesium, or a combination of these metals may be used other than aluminum.

Next, the metalized film for a positive electrode and the metalized film for a negative electrode are overlapped and wound around in a state in which ends in a width direction are slightly shifted. Moreover, the PP protection film is wound about ten times to manufacture the cylindrical winding body. Then, a curved outer peripheral surface of this winding body is pressed from both sides in a radial direction of the winding body to machine the winding body into the flat shape (the shape having the two flat surfaces and the two curved surfaces). Moreover, metallikon electrode 11 is formed by thermally spraying zinc on the two end surfaces that face each other of the winding body machined into the flat shape. With this configuration, film capacitor element 1, in which the vapor-deposited metal layers that face via the dielectric film are connected to the metallikon electrode, is completed.

(Bus Bar Mounting Process)

Positive electrode bus bar 2A and negative electrode bus bar 2B are mounted on holding member 3 in a bus bar mounting process. First, positive electrode bus bar 2A, negative electrode bus bar 2B, holding member 3, and a mounting jig are prepared. Next, holding member 3 is mounted on a mounting surface of the mounting jig and holds the mounting jig. Then, ends 2A4 of positive electrode bus bar 2A are inserted into slits 3S provided at both ends in the longitudinal direction (the X direction) of the first principal surface (the plus Y direction side) of flat plate 31 along a direction of arrow AR1 in FIG. 2. Further, ends 2B4 of negative electrode bus bar 2B are inserted into slits 3S provided at both ends in the longitudinal direction (the X direction) of the second principal surface (the minus Y direction side) of flat plate 31 along a direction of arrow AR2 in FIG. 2. Then, lower surfaces of positive electrode bus bar 2A and negative electrode bus bar 2B abut on the mounting surface of the mounting jig, thereby finishing the insertion of positive electrode bus bar 2A and negative electrode bus bar 2B. The bus bar mounting process is completed by removing the holding member 3 mounted with positive electrode bus bar 2A and negative electrode bus bar 2B from the mounting jig.

The positions in the X direction of positive electrode bus bar 2A and negative electrode bus bar 2B can be regulated by inner surfaces 3S11 of vertical walls 3S1 configuring slits 3S. Further, the positions in the Y direction of positive electrode bus bar 2A and negative electrode bus bar 2B can be regulated by protrusions 3A provided on flat plate 31 and parallel walls 3S2. Also, positions in the Z direction of positive electrode bus bar 2A and negative electrode bus bar 2B can be regulated by the mounting surface of the mounting jig.

Since positive electrode bus bar 2A and negative electrode bus bar 2B are respectively pressed and held by protrusions 3A provided on flat plate 31 and parallel walls 3S2, mutual relative positional relations in three directions (X, Y, Z) of positive electrode bus bar 2A, negative electrode bus bar 2B, and holding member 3 are fixed. In other words, positioning is completed, and the relative positional relations in the three directions are not changed even after holding member 3 is removed from the mounting jig. As compared with the conventional technique where the relative positional relation between capacitor element 91 and bus bar 92 is fixed only after capacitor element 91 and bus bar 92 are connected, relative mounting accuracy (positioning accuracy) of positive electrode bus bar 2A and negative electrode bus bar 2B is improved in the configuration of the present exemplary embodiment. Further, since it is easy to handle the holding member mounted with the bus bars in a connecting process, which will be described below, work in the connecting process is facilitated.

(Connecting Process)

Bus bars 2 mounted on holding member 3 and capacitor elements 1 are connected in the connecting process. Three capacitor elements 1 are inserted between third portion 2A3 of bus bar 2A and third portion 2B3 of bus bar 2B so that element connection parts 2A8, 2B8 of bus bars 2A, 2B, respectively, are disposed at predetermined positions of metallikon electrodes 11 of capacitor elements 1. Next, element connection part 2A8 for a positive electrode and metallikon electrode 11 are connected by soldering, resistance welding, or the like, and element connection part 2B8 for a negative electrode and metallikon electrode 11 are connected by soldering, resistance welding, or the like. With this configuration, the capacitor elements/the holding member mounted with the bus bars, as shown in FIG. 1 and serving as a main part of the film capacitor, are completed.

In the bus bar mounting/connecting processes of the conventional technique, steps of positioning (a positive electrode), connecting (the positive electrode), positioning (a negative electrode), and connecting (the negative electrode) must be sequentially performed, and the connecting process becomes complex/complicated. However, in the bus bar mounting process and the connecting process of the present exemplary embodiment, since only steps of positioning (the positive electrode, the negative electrode), connecting (the positive electrode), and connecting (the negative electrode) are required, the processes from the bus bar mounting to the connection become simple.

Further, as mentioned above, the relative positions of positive electrode bus bar 2A negative electrode bus bar 2B, and holding member 3 configuring the holding member mounted with the bus bars are fixed in the three directions of X/Y/Z by the single holding member mounted with the bus bars and without using the mounting jig. Accordingly, handling is easy, and there is no possibility that the relative positions of the holding member and the bus bars in one direction (the Y direction) are shifted for a period after the positioning (temporary fixing) until the connection as with the conventional technique.

(Sealing Process)

Capacitor elements 1 are sealed in the sealing process, and the film capacitor is completed. First, a top open type resin case (not shown) having a recess is prepared. Next, the capacitor elements/the holding member mounted with the bus bars are housed in the recess of the case. It should be noted that external connection terminals 2A9, 2B9 of respective bus bars 2A, 2B protrude from the recess of the case to the outside. Next, an opening of the recess of the case is filled with insulating resin liquid of high temperature. After the filling, the insulating resin liquid is cooled and solidified, thereby forming a sealed resin layer. Accordingly, the film capacitor of the present exemplary embodiment is completed.

Second Exemplary Embodiment

In the first exemplary embodiment, bus bar 2 is fixed to holding member 3 by protrusions 3A provided at slit 3S. A second exemplary embodiment is different from the first exemplary embodiment only in that bus bar 2 is fixed to holding member 3 by locking of a locked part with a locking protrusion and without providing protrusions 3A. The other items in the second exemplary embodiment are identical to the items in the first exemplary embodiment. Accordingly, differences between the first and second exemplary embodiments are mainly described, and description of common items is omitted or simplified. Further, the same reference marks as the reference marks in the first exemplary embodiment are assigned to the same members and parts as the members and parts of the first exemplary embodiment.

Figure 4:
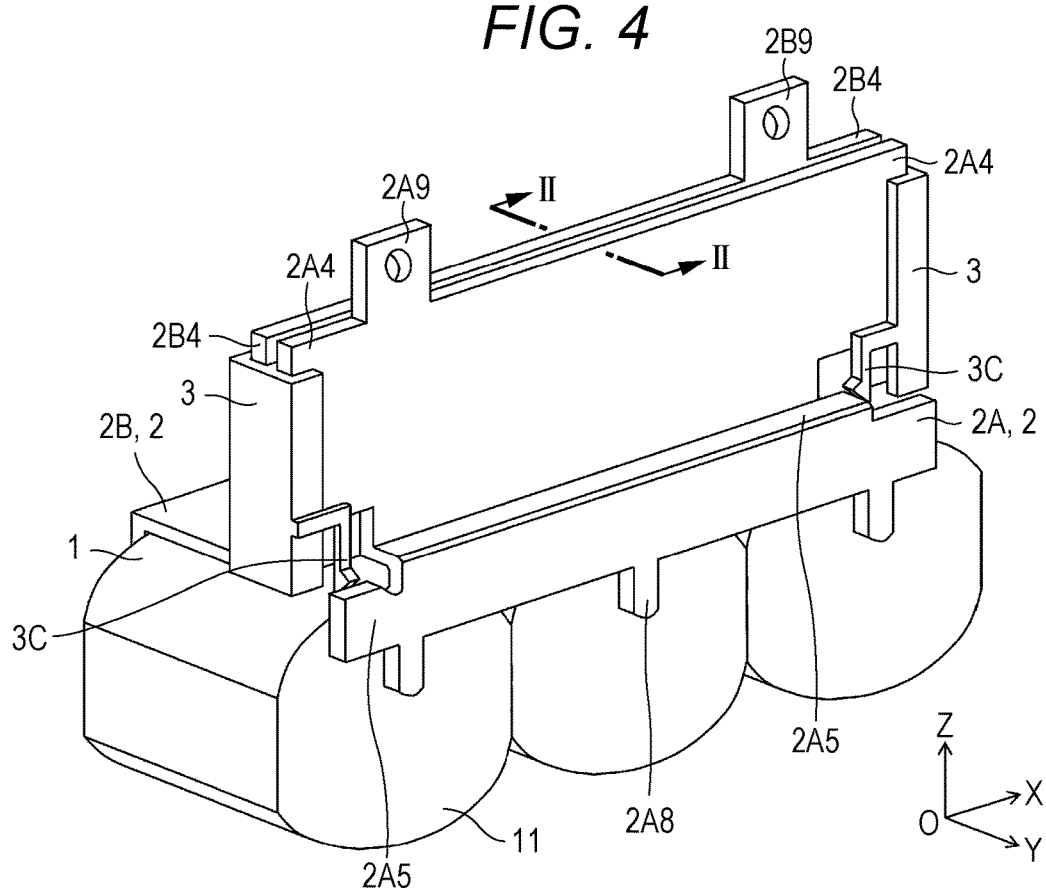
FIG. 4 is a perspective view of a main part of a film capacitor in a second exemplary embodiment of the present invention.
Figure 5:
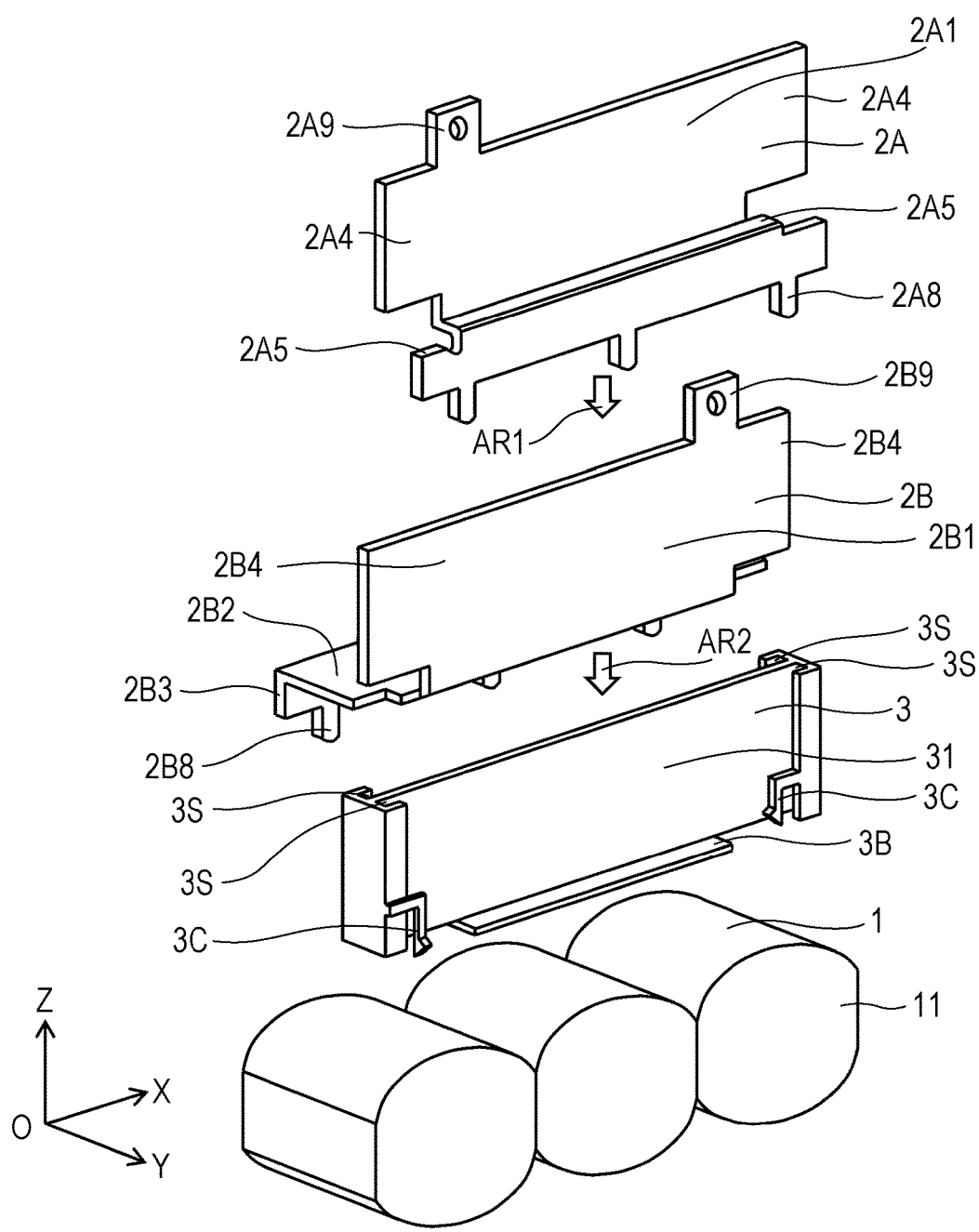
FIG. 5 is an exploded perspective view of the main part of the film capacitor in the second exemplary embodiment of the present invention.

FIG. 4 is a perspective view of a main part (capacitor elements/a holding member mounted with bus bars) of a film capacitor excluding a case and a sealing resin layer according to the second exemplary embodiment. FIG. 5 is an exploded perspective of the main part of the film capacitor.

As shown in FIG. 4, the film capacitor in the second exemplary embodiment includes three capacitor elements 1.

FIG. 6 is a perspective view of positive electrode bus bar 2A used in the second exemplary embodiment. As mentioned above, positive electrode bus bar 2A is the same as positive electrode bus bar 2A used in the first exemplary embodiment. Locked part 2A5 is provided at a minus X side end of third portion 2A3, and locked part 2A5 is also provided at a plus X side end of second portion 2A2.

Figure 11:
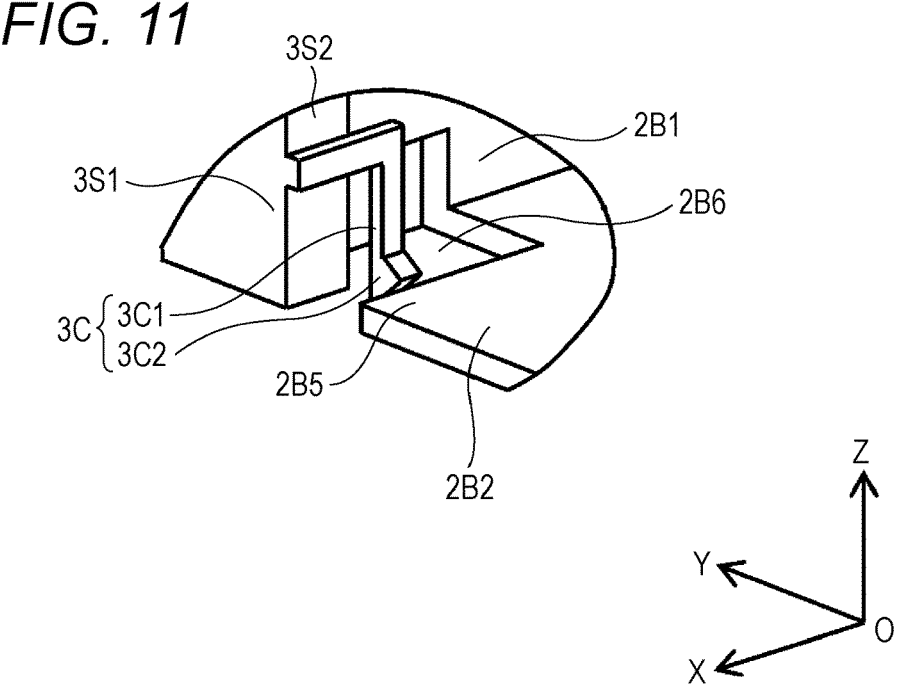
FIG. 11 is a partial perspective view of a vicinity of one locked part of a negative electrode bus bar and a locking protrusion of the holding member of the film capacitor in the second exemplary embodiment of the present invention.
Figure 12:
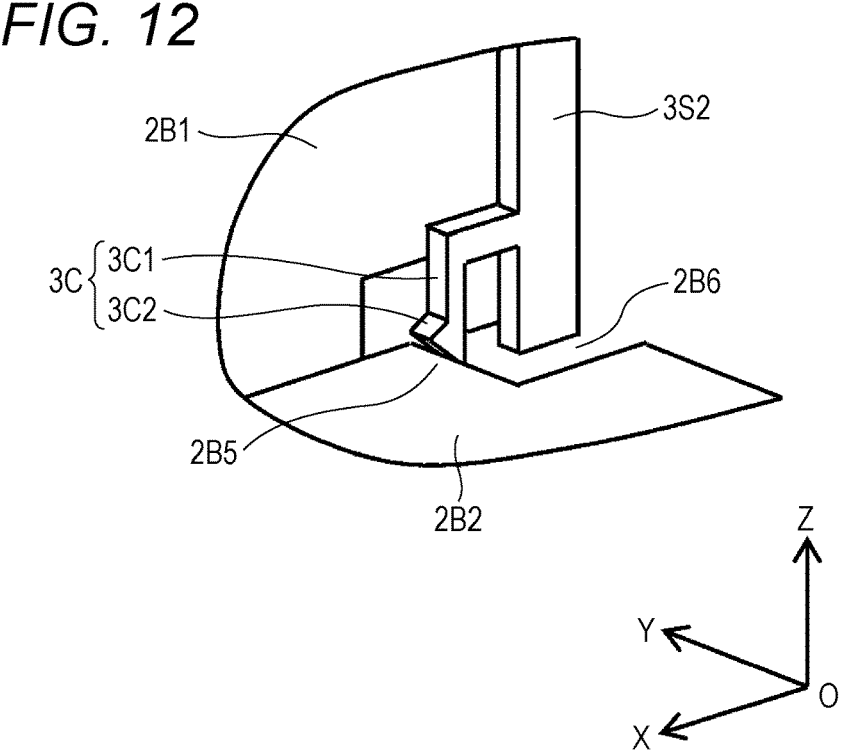
FIG. 12 is a partial perspective view of a vicinity of another locking protrusion of the negative electrode bus bar and a locked part of the holding member of the film capacitor in the second exemplary embodiment of the present invention.

FIG. 11 is a partial perspective view of the plus X side end and FIG. 12 is a partial perspective view of the minus X side end, when the main part of the film capacitor is viewed from a second principal surface side (a minus Y side) of flat plate 31 of holding member 3. Further, negative electrode bus bar 2B, though not described with reference to a single drawing, is also the same as negative electrode bus bar 2B used in the first exemplary embodiment. As shown in FIG. 11, locked part 2B5 and cut-away part 2B6 are provided at the plus X side end of second portion 2B2. As shown in FIG. 12, locked part 2B5 and cut-away part 2B6 are provided at the minus X side end of second portion 2B2.

Figure 7:
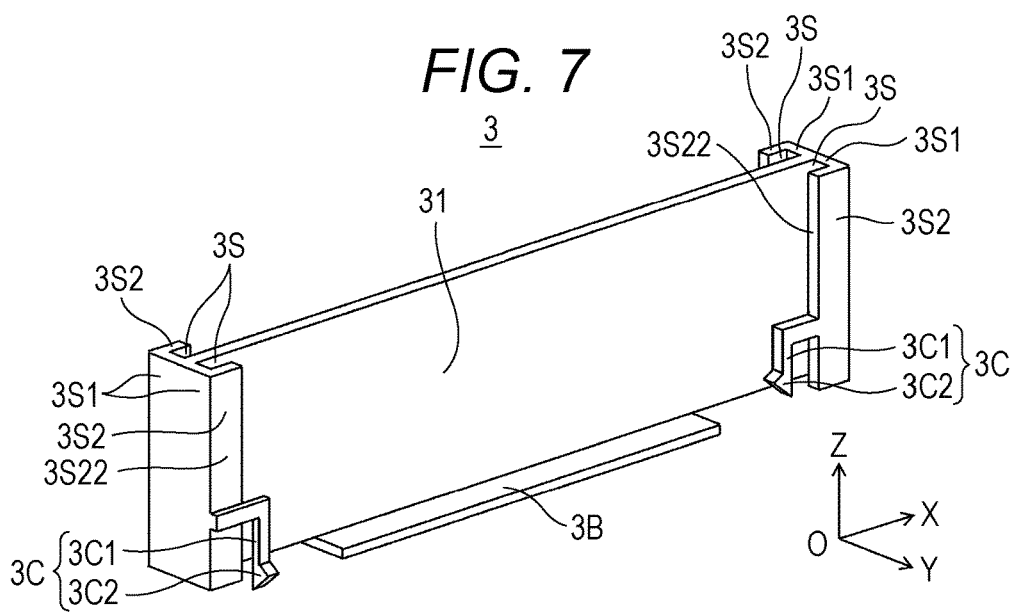
FIG. 7 is a perspective view of a holding member of the film capacitor in the second exemplary embodiment of the present invention.

FIG. 7 is a perspective view of holding member 3 of the present exemplary embodiment. Holding member 3 is formed of an insulating resin and includes four slits 3S as with the first exemplary embodiment. However, protrusion 3A provided in the first exemplary embodiment is not formed on flat plate 31 or parallel wall 3S2. Also, locking protrusion 3C is provided on each of outer surfaces 3S22 of four parallel walls 3S2. Each locking protrusion 3C has arm 3C1 and pawl 3C2 provided at an end of arm 3C1. Further, abutting part 3B is integrally connected to lower parts of two principal surfaces of flat plate 31. An upper surface of each abutting part 3B is vertical to an extending direction (a Z direction) of slit 3S, that is, parallel to an X direction and a Y direction.

Figure 8:
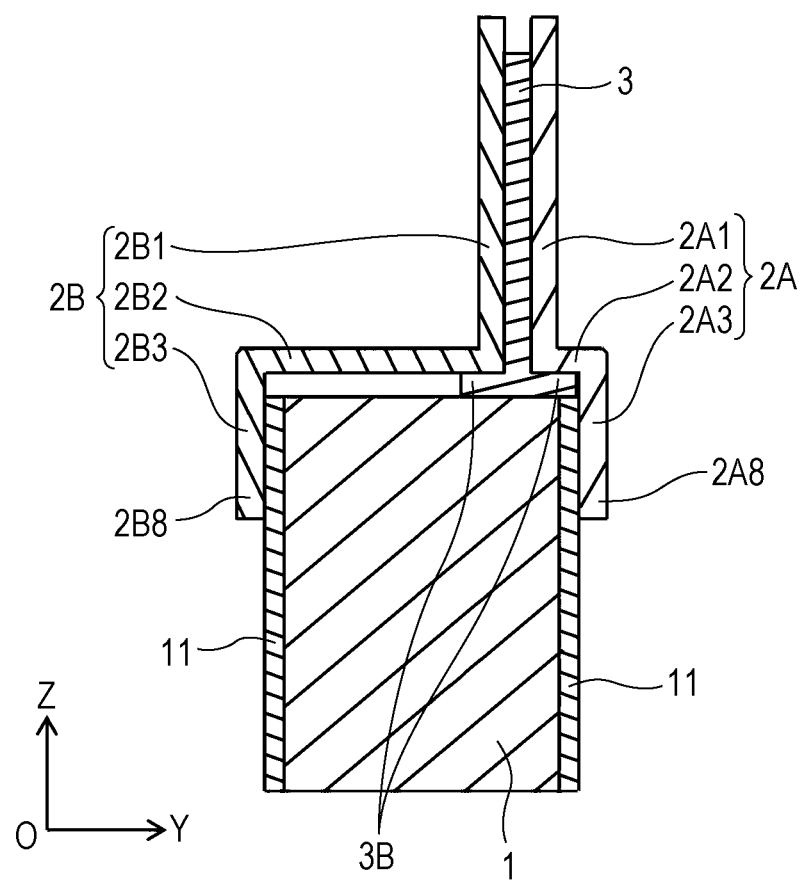
FIG. 8 is a sectional view of the main part of the film capacitor in the second exemplary embodiment of the present invention.

FIG. 8 is a sectional view taken along a cutting line II-II in FIG. 4. Positive electrode bus bar 2A and negative electrode bus bar 2B are fitted into slits 3S of holding member 3. Further, as shown in FIG. 8, a lower surface of second portion 2A2 of positive electrode bus bar 2A and a lower surface of second portion 2B2 of negative electrode bus bar 2B abut on the upper surface of abutting part 3B. Bus bars 2A, 2B are fitted into slits 3S, thereby regulating in the X direction and the Y direction. Bus bars 2A, 2B abut on abutting part 3B, thereby regulating movement in a minus Z direction.

As shown in FIGS. 4, 11, and 12, since locked parts 2A5, 2B5 of respective bus bars 2A, 2B are locked by pawls 3C2 of locking protrusions 3C of holding member 3, movement in a plus Z direction of bus bars 2A, 2B is regulated.

In other words, positive electrode bus bar 2A and negative electrode bus bar 2B are abutted by abutting part 3B from a minus Z side, and are locked from a plus Z side by locking protrusions 3C. With this configuration, positions in the Z direction of positive electrode bus bar 2A and negative electrode bus bar 2B are regulated.

Further, positive electrode bus bar 2A and negative electrode bus bar 2B are sandwiched between two slits 3S in the X direction. More specifically, positive electrode bus bar 2A and negative electrode bus bar 2B are brought into contact with two slits 3S, that is, with inner surfaces 3S11 of vertical walls 3S1 from both the sides in the X direction (the plus X side, the minus X side). With this configuration, positions in the X direction of positive electrode bus bar 2A and negative electrode bus bar 2B are regulated.

Further, positive electrode bus bar 2A and negative electrode bus bar 2B are sandwiched between two slits 3S in the Y direction. More specifically, positive electrode bus bar 2A and negative electrode bus bar 2B are brought into contact with surfaces of flat plate 31 and inner surfaces 3S21 of parallel walls 3S2 in the respective two slits from both sides in the Y direction (a plus Y side, a minus Y side). With this configuration, positions in the Y direction of positive electrode bus bar 2A and negative electrode bus bar 2B are regulated.

It should be noted that the X direction is an example of a second direction, the Y direction is an example of a third direction, and the Z direction is an example of a first direction. In other words, the second direction is vertical to the first direction, and the third direction is vertical to the first direction and the second direction, respectively. Further, the minus Z side is an example of one side in the first direction, and the plus Z side is an example of another side in the first direction. More specifically, in the aforementioned exemplary embodiment, a direction in which slit 3S extends is the first direction, a direction which is vertical to the first direction and parallel to principal surfaces of bus bars 2 (parallel to a first principal surface, a second principal surface of flat plate 31 of holding member 3) is the second direction, and a direction which is vertical to the first direction and the second direction, respectively, is the third direction.

In this way movement in the three directions of X, Y, Z of bus bars 2A, 2B relative to holding member 3 is regulated, and mutual relative positions of positive electrode bus bar 2A, negative electrode bus bar 2B, and holding member 3 are fixed.

(Manufacturing Method)

A method for manufacturing the film capacitor of the present exemplary embodiment is described below. It should be noted that since a capacitor element forming process and a sealing process are the same as the capacitor element forming process and the sealing process in the first exemplary embodiment, the description is omitted.

(Bus Bar Mounting Process)

A bus bar mounting process is described with reference to FIG. 5. Positive electrode bus bar 2A and negative electrode bus bar 2B are mounted on holding member 3 in the bus bar mounting process. Ends 2A4 of positive electrode bus bar 2A are inserted into slits 3S provided at both ends in a longitudinal direction (the X direction) of the first principal surface (a plus Y direction side) of flat plate 31 along a direction of arrow AR1 in FIG. 5. Further, ends 2B4 of negative electrode bus bar 2B are inserted into slits 3S provided at both ends in the longitudinal direction (the X direction) of the second principal surface (a minus Y direction side) of flat plate 31 along a direction of arrow AR2 in FIG. 5. Then, as shown in FIG. 8, the lower surfaces of second portion 2A2 of positive electrode bus bar 2A and second portion 2B2 of negative electrode bus bar 2B abut on the upper surface of abutting part 3B of holding member 3. Accordingly the insertion of positive electrode bus bar 2A and negative electrode bus bar 2B is finished, and the bus bar mounting process is completed.

Figure 9:
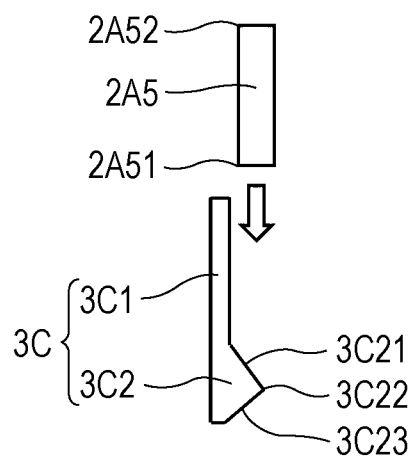
FIG. 9 is a sectional view explaining locking operation of one locked part of the positive electrode bus bar and a locking protrusion of the holding member of the film capacitor in the second exemplary embodiment of the present invention.
Figure 9:
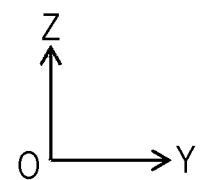
Figure 9:
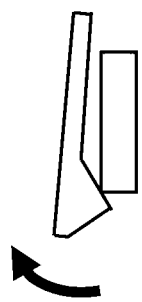
Figure 9:
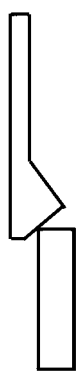

FIG. 9 is a view explaining locking operation between locking protrusion 3C provided at the minus X side end on the first principal surface side of holding member 3 and locked part 2A5 to be locked with locking protrusion 3C. FIG. 9 is a sectional view in which locking protrusion 3C and locked part 2A5 are taken along a cutting line which passes through a center in a width direction (the X direction) of arm 3C1 of locking protrusion 3C. Pawl 3C2 has inclined surface 3C21 connected to arm 3C1, vertex 3C22, and locking surface 3C23 for locking locked part 2A5. Further, locked part 2A5 has rushing side end 2A51 on a side rushing into pawl 3C2 and locked end 2A52 to be locked by locking surface 3C23 of pawl 3C2.

When positive electrode bus bar 2A is inserted into slit 3S, locked part 2A5 moves toward locking protrusion 3C as shown in FIG. 9(a). When positive electrode bus bar 2A is further inserted, locked part 2A5 moves in the minus Z direction while rushing side end 2A51 of locked part 2A5 makes contact with inclined surface 3C21 of pawl 3C2 of locking protrusion 3C. At this time, as shown by an arrow in FIG. 9(b), arm 3C1 is warped, and locking protrusion 3C is pressed down toward the minus Y direction side.

When the insertion is further performed, rushing side end 2A51 of locked part 2A5 passes vertex 3C22 of pawl 3C2, and further, locked end 2A52 of locked part 2A5 also passes vertex 3C22 of pawl 3C2. Also, when the lower surface of second portion 2A2 of positive electrode bus bar 2A abuts on the upper surface of abutting part 3B of holding part 3, as shown in FIG. 9(c), locked end 2A52 of locked part 2A5 and locking surface 3C23 of pawl 3C2 are in contact with each other. A force that arm 3C1 tends to restore from the warp acts on locked end 2A52 of locked part 2A5 toward the plus Y side. Accordingly, locked part 2A5 can no longer move in the plus Z direction.

Figure 10:
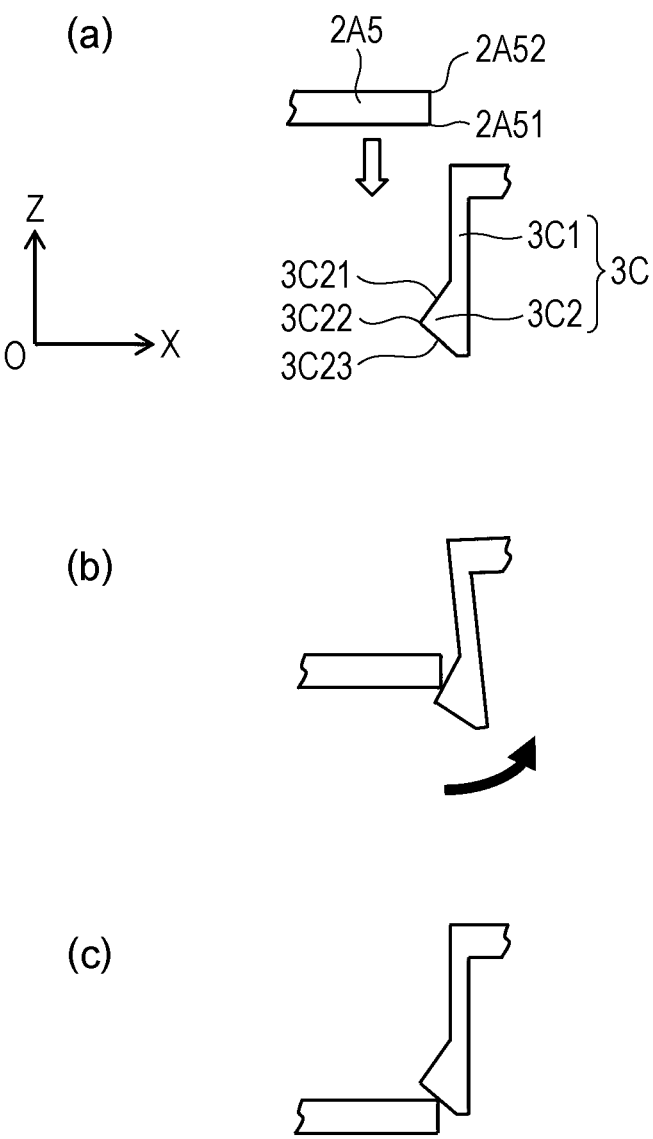
FIG. 10 is a sectional view explaining locking operation of another locked part of the positive electrode bus bar and a locking protrusion of the holding member of the film capacitor in the second exemplary embodiment of the present invention.

FIG. 10 is a view explaining locking operation between locking protrusion 3C provided at the plus X side end on the first principal surface side of holding member 3 and locked part 2A5 to be locked with locking protrusion 3C. FIG. 10 is a sectional view in which locking protrusion 3C and locked part 2A5 are taken along a cutting line which passes through a center in a width direction (the Y direction) of arm 3C1 of locking protrusion 3C. Pawl 3C2 has inclined surface 3C21 connected to arm 3C1, vertex 3C22, and locking surface 3C23 for locking locked part 2A5. Further, locked part 2A5 has rushing side end 2A51 on a side rushing into pawl 3C2 and locked end 2A52 to be locked by locking surface 3C23 of pawl 3C2.

When positive electrode bus bar 2A is inserted into slit 3S, locked part 2A5 moves toward locking protrusion 3C as shown in FIG. 10(a). When positive electrode bus bar 2A is further inserted, locked part 2A5 moves in the minus Z direction while rushing side end 2A51 of locked part 2A5 makes contact with inclined surface 3C21 of pawl 3C2 of locking protrusion 3C. At this time, as shown by an arrow in FIG. 10(b), arm 3C1 is warped, and locking protrusion 3C is pressed down toward the plus X direction side.

When the insertion is further performed, rushing side end 2A51 of locked part 2A5 passes vertex 3C22 of pawl 3C2, and further, locked end 2A52 of locked part 2A5 also passes vertex 3C22 of pawl 3C2. Also, when the lower surface of second portion 2A2 of positive electrode bus bar 2A abuts on the upper surface of abutting part 3B of holding part 3, as shown in FIG. 10(c), locked end 2A52 of locked part 2A5 and locking surface 3C23 of pawl 3C2 are in contact with each other. A force that arm 3C1 tends to restore from the warp acts on locked end 2A52 of locked part 2A5 toward the minus X side. Accordingly, locked part 2A5 can no longer move in the plus Z direction.

In other words, as shown in FIG. 9 and FIG. 10, positive electrode bus bar 2A is locked by locked ends 2A52 from the plus Z side.

It should be noted that since locking operation between locking protrusions 3C of holding member 3 and locked parts 2B5 of negative electrode bus bar 2B is the same as the locking operation between locking protrusions 3C of holding member 3 and locked parts 2A5 of positive electrode bus bar 2A, description of the locking operation is omitted.

Locking protrusions 3C and locked parts 2A5, 2B5 configure so-called snap-fit in which locked parts 2A5, 2B5 are locked by pawls 3C2. Since locking protrusions 3C and locked parts 2A5, 2B5 are snap-fit connected, movement of locked part 2A5 in a direction (the Z direction) opposite to a moving direction (the minus Z direction) of locked part 2A5 can be effectively prevented by utilizing the warp and restoration of arm 3C1.

As mentioned above, by performing the present processes, locked parts 2A5 and 2B5, i.e., positive electrode bus bar 2A and negative electrode bus bar 2B, are regulated both in the minus Z direction and the plus Z direction, and cannot be moved. Further, movement in the X direction and the Y direction is also regulated by the insertion into the slits, and positive electrode bus bar 2A and negative electrode bus bar 2B cannot be moved in the X direction and the Y direction.

The present exemplary embodiment has an advantageous effect in that the relative positions in the Z direction of bus bar 2 and holding member 3 can be easily set only by inserting bus bar 2 into slits 3S of holding member 3 and by abutting bus bar 2 on abutting part 3B, without using the mounting jig used in the first exemplary embodiment.

(Connecting Process)

Bus bars 2 mounted on the holding member and capacitor elements 1 are connected in a connecting process. Three capacitor elements 1 are inserted between third portion 2A3 of bus bar 2A and third portion 2B3 of bus bar 2B so that element connection parts 2A8, 2B8 of bus bars 2A, 2B, respectively, are disposed at predetermined positions of metallikon electrodes 11 of capacitor elements 1. Next, element connection part 2A8 for a positive electrode and metallikon electrode 11 are connected by soldering, resistance welding, or the like, and element connection part 2B8 for a negative electrode and metallikon electrode 11 are connected by soldering, resistance welding, or the like. With this configuration, the capacitor elements/the holding member mounted with the bus bars, as shown in FIG. 4 and serving as a main part of the film capacitor, are completed.

In the bus bar mounting/connecting processes of the conventional technique, steps of positioning (the positive electrode), connecting (the positive electrode), positioning (the negative electrode), and connecting (the negative electrode) must be sequentially performed, and the connecting process becomes complex/complicated. However, in the bus bar mounting process and the connecting process of the present exemplary embodiment, positioning is not required, and only steps of inserting (the positive electrode, the negative electrode), connecting (the positive electrode), and connecting (the negative electrode) are required. Accordingly, the processes from the bus bar mounting to the connection are further simpler than the processes in the first exemplary embodiment, not to mention the processes in the conventional technique.

Further, as with the first exemplary embodiment, the relative positions of positive electrode bus bar 2A, negative electrode bus bar 2B, and holding member 3 configuring the holding member mounted with the bus bars are fixed in the three directions of X/Y/Z by the single holding member mounted with the bus bars and without using the mounting jig. Accordingly handling is easy, and there is no possibility that the relative positions of the holding member and the bus bars in one direction (the Y direction) are shifted for a period after the positioning (temporary fixing) until the connection as with the conventional technique.

In the first and second exemplary embodiments, positive electrode bus bar 2A and negative electrode bus bar 2B having different shapes are used. However, the present invention is not limited to these shapes. For example, positive electrode bus bar 2A and negative electrode bus bar 2B may be shared by making the lengths in the Y direction of the second portions equal.

Further, in the second exemplary embodiment, on each of the first principal surface side and the second principal surface side of flat plate 31 of holding member 3, two snap-fit structures in total are respectively provided at both ends in the direction vertical to the extending direction of the slits. But a configuration provided with only one snap-fit structure can be made. However, in order to prevent movement in the plus Z direction of locked parts 2A5, 2B5 more reliably and set relative positions of external connection terminals 2A9, 2B9 to desirable positions, it is more preferable that the two snap-fit structures in total be provided on each principal surface side as with the second exemplary embodiment.

Figure 13:
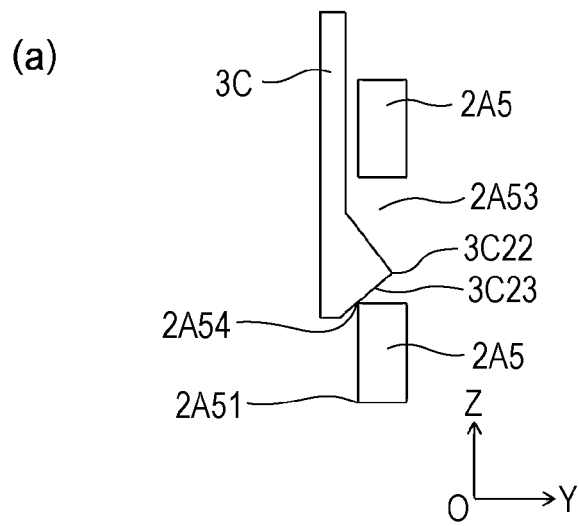
FIG. 13 is a sectional view explaining another locked state of a locking protrusion and a locked part in the second exemplary embodiment of the present invention.
Figure 13:
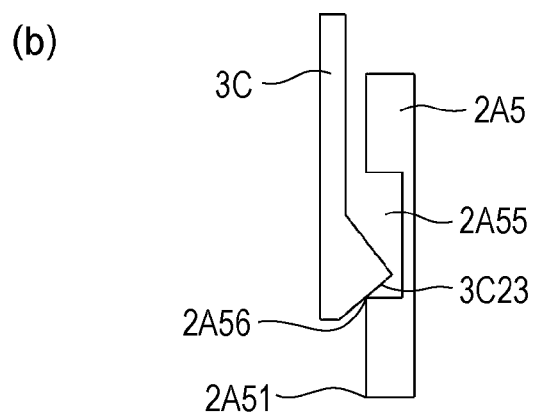
Figure 13:
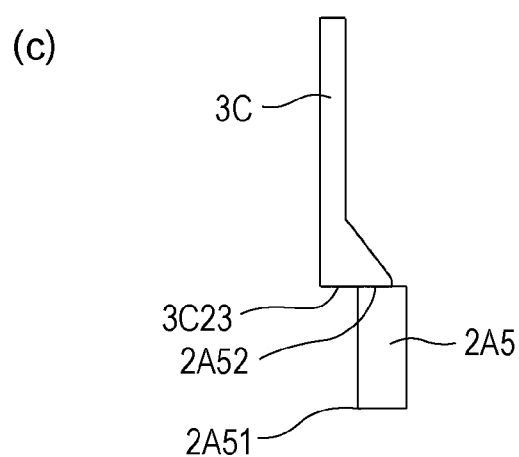
Figure 14:
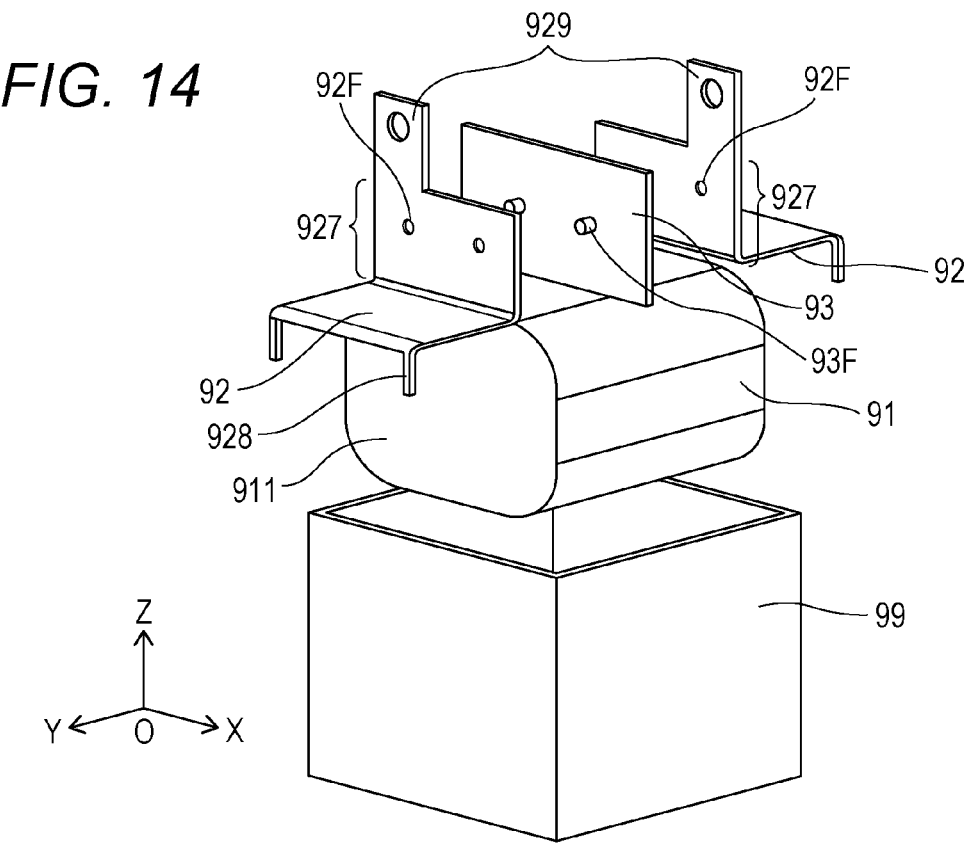
FIG. 14 is an exploded perspective view of a conventional film capacitor.
Figure 15:
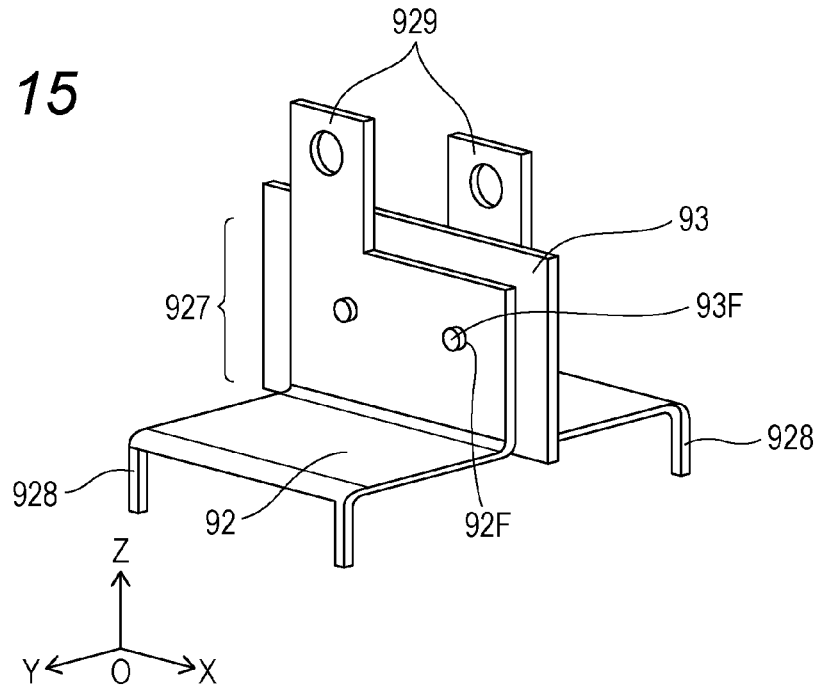
FIG. 15 is a perspective view of a main part of the conventional film capacitor.

A form of locking protrusion 3C of holding part 3 or locked part 2A5 of bus bar 2 shown in the second exemplary embodiment is an illustration, and the form of locking protrusion 3C or locked part 2A5 is not limited to this form. For example, instead of the configuration shown in FIG. 9, configurations shown in FIG. 13 may be provided. FIG. 13 shows states in which locking is completed as with FIG. 9(c). It should be noted that reference marks of parts identical to the parts in FIG. 9 are omitted in FIG. 13 except otherwise specified.

In an aspect of FIG. 13(a), through-hole 2A53 is formed at locked part 2A5 of positive electrode bus bar 2A. Lower end 2A54 of through-hole 2A53 is locked by locking surface 3C23 of pawl 3C2, and locked part 2A5, i.e., positive electrode bus bar 2A, cannot be moved due to regulation of movement in a Z direction. It should be noted that a cross-sectional surface of through-hole 2A53 can have an arbitrary shape, such as a rectangle, a circle, or an oval.

Here, locking operation is briefly described. When positive electrode bus bar 2A is inserted into slit 3S, rushing side end 2A51 of locked part 2A5 passes vertex 3C22 of pawl 3C2. Further, when locked part 2A5 moves in a minus Z direction, lower end 2A54 of through-hole 2A53 starts making contact with locking surface 3C23 of pawl 3C2. When insertion of positive electrode bus bar 2A into slit 3S is completed, the locking operation is in the state shown in FIG. 13(a).

In an aspect of FIG. 13(b), recess 2A55 is formed at locked part 2A5 of positive electrode bus bar 2A. Lower end 2A56 of recess 2A55 is locked by locking surface 3C23 of pawl 3C2, and locked part 2A5, i.e., positive electrode bus bar 2A, cannot move due to regulation of movement in a Z direction. It should be noted that a cross-sectional surface of recess 2A55 can have an arbitrary shape, such as a rectangle, a circle, or an oval. Since locking operation is the same as the locking operation of through-hole 2A53 in FIG. 13(a), description of the locking operation is omitted.

In an aspect of FIG. 13(c), only a shape of locking protrusion 3C is different as compared with the aspect of FIG. 9. More specifically, locking surface 3C2 of pawl 3C is formed substantially vertical to a moving direction (a Z direction) of locked part 2A5, and locked end 2A52 of locked part 2A5 is locked by locking surface 3C23 of pawl 3C2. Locking surfaces 3C23 described in FIG. 9, FIG. 10, and (a) and (b) of FIG. 13 form an angle of 45 degrees to the moving directions of locked parts 2A5. In the aspect of FIG. 13(c), locking surface 3C23 is substantially vertical to the moving direction. Accordingly, the movement of locked part 2A5 in a plus Z direction can be reliably prevented. It should be noted that, since locking operation is the same as the locking operation described in (a) and (b) of FIG. 9, description of the locking operation is omitted.

As shown in FIG. 13, positive electrode bus bar 2A is locked from the plus Z side by lower ends 2A54, 2A56, and locked end 2A52, respectively.

In the second exemplary embodiment, a protrusion is not provided at slit 3S unlike the first exemplary embodiment. However, a configuration provided with protrusions 3A can also be made. By having this configuration, an area where bus bar 2 and holding member 3 are in contact with each other becomes small, and bus bar 2 can be easily inserted into slit 3S of holding member 3.

INDUSTRIAL APPLICABILITY

It is possible to provide a film capacitor capable of improving relative mounting accuracy (positioning accuracy) of positive and negative electrode bus bars, and further, capable of easily connecting the bus bars to capacitor elements.

The invention claimed is:
1. A film capacitor comprising:
a capacitor element including a first metallikon electrode formed at one side end and a second metallikon electrode formed at another side end opposite to the one side end;
a first bus bar connected to the first metallikon electrode and a second bus bar connected to the second metallikon electrode; and
a holding member having slits into which the first bus bar and the second bus bar are inserted, respectively, wherein:
the holding member is formed of an insulating material,
the holding member is disposed over a top of the capacitor element,
the first bus bar and the second bus bar face each other with the holding member interposed between the first bus bar and the second bus bar,
the film capacitor further comprises an overlapping part formed of the first bus bar, the holding member and the second bus bar,
the holding member has a flat plate, a first holding portion disposed at an end of the flat plate in a longitudinal direction and a second holding portion disposed at another end of the flat plate in the longitudinal direction,
the first holding portion and the second holding portion include the slits, respectively, and
a first face of the flat plate faces the first bus bar and a second face opposite to the first face of the flat plate faces the second bus bar.
2. The film capacitor according to claim 1, wherein the slits are provided at ends of the holding member, respectively.
3. The film capacitor according to claim 1, wherein:
the holding member has protrusions formed in the slit, and
the first bus bar and the second bus bar inserted into the slit are press-contacted with the protrusions such that the first bus bar and the second bus bar are held by the holding member.
4. The film capacitor according to claim 1, wherein:
a plurality of capacitor elements, each being the capacitor element, are provided, and
the first bus bar is connected to first metallikon electrodes of the plurality of capacitor elements and the second bus bar is connected to second metallikon electrodes of the plurality of capacitor elements.
5. The film capacitor according to claim 1, wherein:
the holding member includes an abutting part, and
the first bus bar and the second bus bar are each abutted by the abutting part from one side in a direction along which the slits extend.
6. A film capacitor comprising:
a capacitor element in which a metallikon electrode is formed at an end;
a bus bar connected to the metallikon electrode and having a locked part; and
a holding member having slits into which the bus bar is inserted, an abutting part, and a locking protrusion,
wherein when an extending direction of the slits is a first direction, a direction perpendicular to the first direction and parallel to a principal surface of the holding member is a second direction, and a direction perpendicular to each of the first direction and the second direction is a third direction,
the bus bar is sandwiched between the slits in the second direction and is sandwiched between the slits in the third direction, and the bus bar is abutted by the abutting part from one side in the first direction and is locked by the locking protrusion from another side in the first direction.

7. The film capacitor according to claim 6, wherein:
the bus bar includes a first bus bar and a second bus bar,
the metallikon electrode includes a first metallilkon electrode coupled to the first bus bar and a second metallikon electrode coupled to the second bus bar,
the holding member is formed of an insulating material,
the holding member has a slit into which the first bus bar is inserted and a slit into which the second bus bar is inserted,
the first bus bar and the second bus bar face each other with the holding member interposed between the first bus bar and the second bus bar,
when a direction vertical to the first direction is a second direction, and a direction vertical to each of the first direction and the second direction is a third direction,
the first bus bar and the second bus bar are each press-contacted with the slits from both sides in the second direction and are each press-contacted with the slits from both sides in the third direction, and the first bus bar and the second bus bar are each abutted by the abutting part from the one side in the first direction and are locked by the locking protrusion from the other side in the first direction.

8. The film capacitor according to claim 6, wherein the locking protrusion has an arm and a pawl protruded from the arm, and the locking protrusion and the locked part configure a snap-fit in which the locked part is locked by the pawl.

9. The film capacitor according to claim 8, wherein one snap-fit being the snap-fit is provided at each end in the second direction of the holding member.

10. The film capacitor according to claim 6, wherein
the slits are formed with a protrusion, and
the protrusion press-contacts the bus bar.

11. The film capacitor according to claim 6, wherein the slit is provided at each end of the holding member.

12. A film capacitor comprising:
a capacitor element including a first metallikon electrode formed at one side end and a second metallikon electrode formed at another side end opposite to the one side end;
a first bus bar connected to the first metallikon electrode and a second bus bar connected to the second metallikon electrode; and a holding member having holding portions and a plate connecting the holding portions, wherein:
the holding portions include slits into which the first bus bar and the second bus bar are inserted, respectively,
the first bus bar and the second bus bar face each other with the holding member interposed between the first bus bar and the second bus bar,
the holding member has a flat plate, a first holding portion disposed at an end of the flat plate in a longitudinal direction and a second holding portion disposed at another end of the flat plate in the longitudinal direction,
the first holding portion and the second holding portion include the slits, respectively, and
a first face of the flat plate faces the first bus bar and a second face opposite to the first face of the flat plate faces the second bus bar.

13. The film capacitor according to claim 12, wherein:
a plurality of capacitor elements, each being the capacitor element, are provided, and
the first bus bar is connected to first metallikon electrodes of the plurality of capacitor elements and the second bus bar is connected to second metallikon electrodes of the plurality of capacitor elements.

14. The film capacitor according to claim 12, wherein vertical sides of the first bus bar and vertical sides of the second bus bar are inserted into the slits, respectively.

15. The film capacitor according to claim 12, wherein the holding member is disposed over a top of the capacitor element.

16. The film capacitor according to claim 12, wherein the slits are provided ends of the holding member, respectively.

17. The film capacitor according to claim 12, wherein:
the holding member includes an abutting part, and
the first bus bar and the second bus bar are each abutted by the abutting part from one side in a direction along which the slits extend.

18. The film capacitor according to claim 12, wherein:
the holding member has protrusions formed in the slit, and
the first bus bar and the second bus bar inserted into the slit are press-contacted with the protrusions such that the first bus bar and the second bus bar are held by the holding member.

* * * * *